J. WILCOX.
TREE SPRAYER.
APPLICATION FILED JUNE 16, 1913.

1,135,341.

Patented Apr. 13, 1915.

Witnesses
E. E. King
G. E. Cilley

Inventor
Jay Wilcox,
By
Ithiel J. Cilley
Attorney

UNITED STATES PATENT OFFICE.

JAY WILCOX, OF ROTHBURY, MICHIGAN.

TREE-SPRAYER.

1,135,341.  Specification of Letters Patent.  Patented Apr. 13, 1915.

Application filed June 16, 1913. Serial No. 774,066.

*To all whom it may concern:*

Be it known that I, JAY WILCOX, a citizen of the United States, residing at Rothbury, in the county of Oceana and State of Michigan, have invented certain new and useful Improvements in Tree-Sprayers, of which the following is a specification.

My invention relates to improvements in governing appliances for fruit tree sprayers, and its objects are: first, to provide a means whereby the pressure in the spraying tank will be automatically kept at a uniform degree, and, second, to provide a means whereby the supply of spraying material to the spraying tank will be automatically held uniform thus producing a steady, unvarying spray upon the trees. I attain these objects by the mechanism illustrated in the accompanying drawing, in which—

Figure 1:
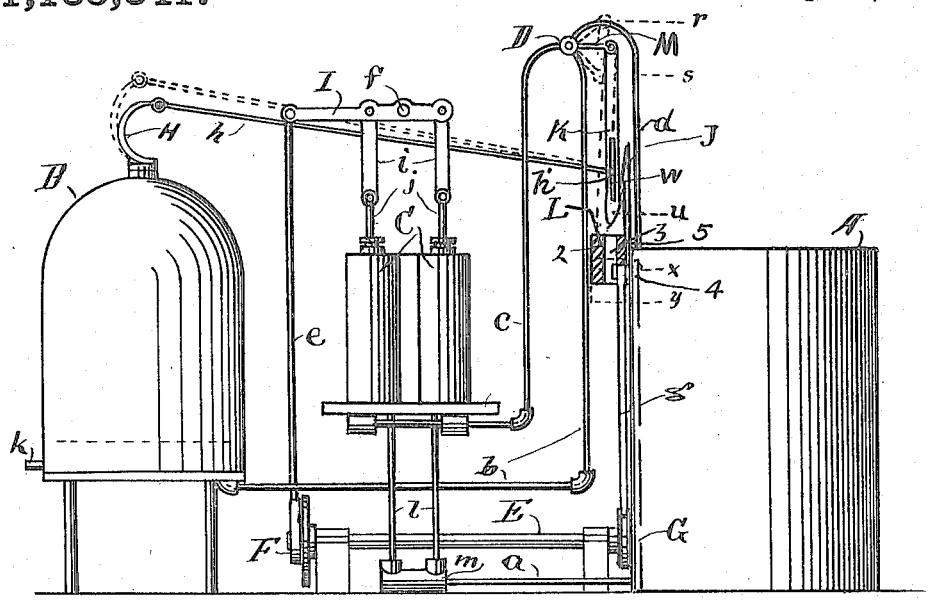
Figure 2:
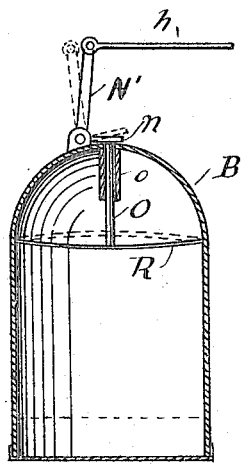
Figure 5:
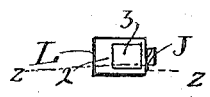
Figure 4:
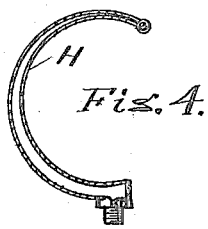
Figure 3:
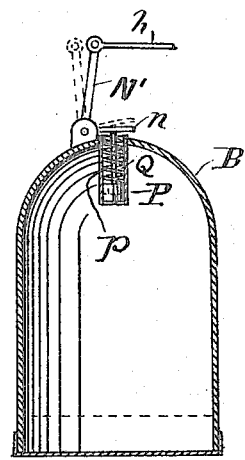

Figure 1 is an elevation of the spraying machine complete but showing the actuating slide in section on the line $z\ z$ of Fig. 5. Figs. 2 and 3 are sectional elevations of the spraying tanks showing, respectively, a diaphragm and a cylinder and piston appliances for operating the governing elements of my sprayer, Fig. 4 is an enlarged sectional elevation of a hollow spring, as shown in Fig. 1, for actuating the governing elements of the sprayer, and Fig. 5 is a top plan of the slide.

Similar letters refer to similar parts throughout the several views.

In Fig. 1 A represents the supply tank from which the spraying material is pumped through the pipes $a$, $m$ and $l$ into the pumps C, and thence through the pipe $c$ to the three way valve D. From the valve D the material is forced, normally, through the pipe $b$ into the spraying, or compression tank B. This tank is normally filled with air only, but when the spraying material is forced into it, say to about the depth indicated by the dotted lines near the bottom of the tanks, the air becomes compressed sufficiently to exercise a considerable pressure upon the surface of the spraying material so as to cause it to flow with considerable force through the discharge tube $k$ to and through any desired form of sprayer for the purpose of reducing the material to the finest possible spray and forcing it to the greatest possible, available distance into the trees being sprayed.

E represents the main driving shaft by means of which power and motion are transmitted to the pumps C, through the agency of the crank F, the connecting rod $e$ that connects the crank F with the pump lever I, the said pump lever being pivotally supported at $f$ so that its vertical reciprocating movements, transmitted from the crank F, will give to the connecting rods $i$ and piston rods $j$ a like reciprocating motion, thus giving to the pump pistons, not shown, alternate vertical movement, in the form of pump here indicated. It is to be understood that connections and modes of operation must necessarily vary with various forms of pumps, the present form being shown simply as being more easily illustrated and explained than some more complicated forms might be.

The lever M, of the three-way valve D is shown, in Fig. 1 in position to shut off the flow of any liquid through the valve D. When the pressure is low in the tank or compression chamber B the hook K will be held practically in the position indicated by its solid lines in Fig. 1. There are two independent appliances provided for actuating this hook, as follows: First, the slide L having attached to it the hook J (as at 5) which stands, normally, in position to engage the hook K when the hook J is drawn downward. This is brought about by the action of the slide L, which is made to reciprocate vertically by means of the eccentric G on the main shaft, through the medium of the connecting rod $g$ which is secured at the lower end to the eccentric, and is pivotally connected at the upper end to the slide L as at 4. The upper end of the slide L is formed practically as indicated in Fig. 5, in which 3 indicates an opening down into the slide into which the hook K may pass when the slide is raised to the position indicated by the dotted lines $u$ and $x$ and may be drawn downward by the hook J when the slide L is drawn downward and carry the valve lever M down to the position indicated by the dotted lines $s$, thus opening the valve to the pipe $b$ and forcing the contents of the pump into and through the pipe $b$ to the compression chamber B until the pressure in this chamber has raised sufficiently to actuate the hollow spring H to carry it to the position indicated by its dotted lines, the connecting rod $h$ will draw the hook K back from under the hook J so that when the slide L rises to the position indicated by the dotted lines $u$, the lower end of the hook K will be in position to be acted upon by the solid portion, 2, of the slide and the slide will force it upward and carry the lever M to the position indicated at r and open the valve to the pipe d when all material passing through the pumps will be discharged back into the storage tank A until the pressure in the tank B has reduced sufficiently to allow the spring H to assume its normal position when the hook K will be again engaged by the hook J and be drawn down to position to again open the valve D to the pipe b. It will be readily seen that by this means a constant and steady pressure may be sustained in the tank B and thus a uniform spray is insured.

Thus far I have indicated the use, only, of a hollow spring H, such as is used in steam gages, for actuating the latch K to control the pressure in, and the flow to the tank B, but the same results may be obtained by the use of a diaphragm, as indicated at R in Fig. 2, in which case a bell crank, N, actuated by the action of the rod O, passing through the case o, is raised and lowered by the movement of the diaphragm R as the pressure in the tank varies to raise and lower this diaphragm, the rod O acting on the arm n of the bell crank, as indicated. The same result may, also, be obtained by the use of a cylinder Q having a piston P and actuating spring p, with the piston connections arranged to act upon the arm n as indicated, or any other available means may be employed as desired without departing from the spirit of my invention.

I prefer that the hook K be provided with a slot, as w, for the reception of the pin h' at the end of the rod h so that the hook K may be raised by the slide L, when said slide is raised to the position indicated by the dotted lines u—x and the hook is in position to be forced upward by the slide L as hereinbefore described; or may be lowered by the hook J when the slide has been lowered to the position indicated by the dotted lines x—y and the hook K is in position to be acted upon by the hook J, without carrying the end h' of the rod h upward and downward with it, it being understood that this end of the rod h is supported by some available means so that while it may not be moved upward and downward it will readily slide longitudinally as it is actuated by the spring H or other available means as hereinbefore mentioned.

What I claim as new, and desire to secure by Letters Patent of the United States, is:

1. In combination with the storage tank, compression tank, pumps and connecting pipes of a power spraying machine, a three-way valve, a pipe from the pump to the three-way valve, a pipe from the three-way valve to the compression tank, and a pipe from the three-way valve to the supply tank, a hook connected with the three-way valve, a vertically reciprocating slide having a hook to engage the hook on the three-way valve to open and close the valve, and means for causing the hooks to engage and disengage to actuate the three way valve and to hold the pressure constant in the compression chamber.

2. In combination with a supply tank, compression tank, force pump and supply pipes of a spraying machine, a three-way valve in the line of the supply pipe, an overflow pipe from the valve, an actuating hook connected with the valve, a vertically reciprocating slide in position to engage and actuate said hook, means connected with the compression tank and with the actuating hook to engage and disengage said hooks and hold the pressure constant in the compression chamber.

3. In combination with the storage tank, compression tank, force pump and connecting pipes of a power sprinkling machine, a three-way valve in the line of the supply pipe, an overflow pipe from said valve to the supply tank, an actuating arm on the valve, an actuating hook on said arm, a vertically reciprocating slide arranged to actuate the actuating hook, said slide having an opening in the top into which the actuating hook may pass when actuated by the slide on its downward stroke, a solid surface on the slide adjacent to said opening to engage the actuating hook upon the upward stroke of the slide, and means connected with the compression tank and actuated by the pressure in the said tank to swing the actuating hook to position to pass into the opening in the slide or be engaged by the solid portion of the slide according to the degree of pressure in the compression tank.

4. In combination with the storage tank, compression tank, pumps, and connecting pipes of a spraying machine, a three-way valve in the line of the supply pipe, an overflow pipe connected with the supply pipe, a vertically reciprocating slide having a hook thereon, an arm on the valve, an actuating hook pivotally secured to said arm, a hollow spring connected with the compression tank in a manner to be actuated by the pressure from the tank passing into it, a connecting rod from the spring to the actuating hook so connected as to cause the actuating hook to engage with, or disengage from the sliding hook to hold the pressure in the compression chamber constant.

Signed at Grand Rapids Michigan June 9 1913.

JAY WILCOX.

In presence of—
I. J. CILLEY,
JOHN W. HILDING.